United States Patent [19]

Kahn

[11] Patent Number: 4,717,247
[45] Date of Patent: Jan. 5, 1988

[54] ARRANGEMENT FOR DIVERTING LIGHT

[75] Inventor: David A. Kahn, Nepean, Canada

[73] Assignee: Northern Telecom Limited, Montreal, Canada

[21] Appl. No.: 906,708

[22] Filed: Sep. 12, 1986

[51] Int. Cl.[4] .......................... G02B 6/00; G02B 5/08; G02B 5/04
[52] U.S. Cl. .................... 350/617; 350/618; 350/286
[58] Field of Search ............... 350/286, 287, 616, 618, 350/621, 359, 617, 96.21

[56] References Cited

U.S. PATENT DOCUMENTS

| 3,424,516 | 1/1969 | Snyder | 350/286 |
| 3,534,671 | 10/1970 | Yamaguchi | 350/286 |
| 3,541,919 | 11/1970 | Weyrauch | 350/286 |
| 4,126,876 | 11/1978 | Jones | 350/286 |

FOREIGN PATENT DOCUMENTS 1016753  5/1983  U.S.S.R. ............................. 350/286

Primary Examiner—Jon W. Henry
Attorney, Agent, or Firm—T. Adams

[57] ABSTRACT

Light is diverted from one optical conductor to another optical conductor by a suitably oriented non-planar reflecting surface at the junction of the two optical conductors. The non-planar surface comprises facets arranged so that light incident on one facet from one optical conductor will be reflected at that facet onto an adjacent facet, and at the adjacent facet to the other optical conductor. The arrangement of facets is such that the Snell's Law condition for total internal reflection at each facet can be satisfied for a wider range of ray directions than is possible for a single planar reflecting surface. The arrangement is useful for optical backplanes now being proposed for use in computers and telecommunications equipment.

12 Claims, 4 Drawing Figures

ARRANGEMENT FOR DIVERTING LIGHT

The invention relates to optical waveguides or conductors such as are used in telecommunications and like equipment, and is especially concerned with diverting light from a first direction through a predetermined angle to a second direction.

Optical conductors now being proposed for use in backplanes of computers and telecommunications equipment comprise rods of light-transmissive material surrounded by material having a lower refractive index. In such applications it is desirable to divert light from one of such optical conductors to another oriented at a predetermined angle with respect to the first. A suitably oriented planar surface may be provided at the junction of the two optical conductors with the object of totally internally reflecting light from one conductor to the other.

Light propagating in a multimode optical conductor has a range of ray directions around a central ray aligned with the axis of the conductor. Some of these ray directions may not satisfy the Snell's Law condition for total internal reflection at the planar surface, even if the central ray direction does satisfy this condition. Accordingly some of the light may not be diverted to the other optical conductor as intended, but may instead be transmitted through the planar surface. The optical loss due to transmission through the planar surface depends on the materials and design of the optical conductors, and on the angle between them.

The above problem could be overcome by applying a reflective coating to the planar surface. This approach requires additional materials and additional manufacturing steps.

The present invention seeks to obviate or mitigate the above problem without the use of a reflective coating.

According to one aspect of the invention, there is provided an arrangement for diverting light from a first direction through a predetermined angle to a second direction, the arrangement comprising: first and second optical conductors for alignment, respectively, with the first and second directions each optical conductor comprising an elongate member of light transmissive material; and a connecting member for optically connecting the first and second optical conductors together; the connecting member having a face comprising at least one pair of adjacent facets extending in mutually intersecting planes, the line of their intersection extending parallel to the plane containing the first and second directions and inclined to the first and second directions such that light incident on one of the pair of adjacent facets in the first direction will be reflected at that facet onto the other of the pair of adjacent facets and reflected at that other facet to depart from that other facet in the second direction.

According to another aspect of the invention, there is provided an arrangement for diverting light from a first direction through a predetermined angle to a second direction, the arrangement comprising: first and second optical conductors for alignment, respectively, with said first and second directions; and a connecting member for optically connecting said first and second optical conductors together; said connecting member having a reflecting face comprising at least one pair of adjacent facets extending in mutually intersecting planes, the line of their intersection extending parallel to the plane containing said first and second directions and inclined to said first and second directions such that light incident on one of said pair of adjacent facets in said first direction will be reflected at said one of said facets onto the other of said pair of adjacent facets and reflected at said other of said adjacent facets to depart from said other of said adjacent facets in said second direction, and said connecting member having first and second substantially planar faces, each oriented substantially normal to a respective one of said first and second directions for abutment with a respective one of said first and second optical conductors.

According to yet another aspect of the invention, there is provided an optical conductor having an integral reflecting member comprising an elongate body of light transmissive material having a face comprising at least one pair of adjacent facets extending in mutually intersecting planes, the line of their intersection inclined to the longitudinal axis of said elongate member such that light travelling along such elongate member and incident on one of said pair of adjacent facets will be reflected at said one of said facets onto the other of said pair of adjacent facets, and reflected at said other of said adjacent facets so as to depart laterally from said elongate body, or vice versa.

In a preferred embodiment, the reflecting face of the connecting member comprises a plurality of such pairs of adjacent facets extending in intersecting planes, the line of intersection of each pair extending parallel to those of the other pairs in a common plane perpendicular to the plane containing the first and second directions.

Conveniently, the connecting member has first and second substantially planar faces, each oriented normal to a respective one of the first and second directions for abutment with a respective one of the first and second optical conductors so as to optically couple the respective optical conductors to the connecting member. Alternatively, the connecting member may be integral with one or both of the optical conductors.

An embodiment of the invention will now be described, by way of example, with reference to the accompanying drawings, in which.

Figure 1:
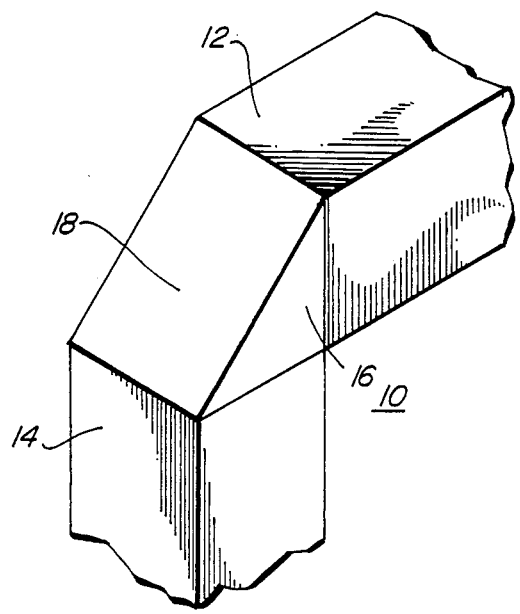
FIG. 1 is a perspective view of an arrangement for diverting light through a right angle.

FIG. 1 shows an arrangement 10 for diverting light through a right angle which comprises mutually perpendicular optical conductors in the form of elongate members 12, 14 of light transmissive material, such as polycarbonate plastics or glass, joined by a connecting member 16. The connecting member 16 has a planar face 18 inclined 45° to the respective axes of the elongate members 12, 14 so that light incident on the planar face 18 along the axis of one of the elongate members 12, 14 will be reflected along the axis of the other of the elongate members 12, 14.

The Snell's Law condition for total internal reflection at the planar surface 18 of such an axial ray 20 is:

$$n > \operatorname{secant}(45°) \simeq 1.414,$$

where n is the refractive index of the connecting member 16. This condition can be met using conventional optical materials, such as optical plastics and glasses, which typically have refractive indices≃1.5.

Figure 2:
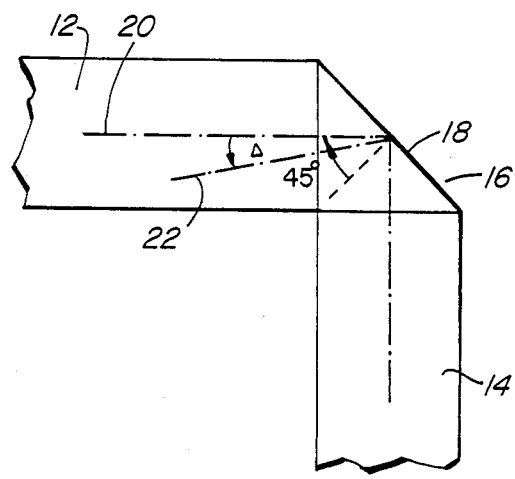
FIG. 2 is a ray diagram illustrating the operation of the arrangement of FIG. 1.

In multimode optical conductors, such as elongate members 12, 14, propagating modes have a spread of ray directions around the axial ray 20. Thus, even if the Snell's Law condition for total internal reflection is satisfied for the axial ray 20, it may not be satisfied for a ray 22 at a ray angle Δ to the axial ray 20 (see FIG. 2). Indeed, the Snell's Law condition for total internal reflection of ray 22 at the planar face 18 is:

$$n > \text{secant}(45° - \Delta).$$

Thus, to accommodate all rays at maximum ray angles, which may exceed 15° for typical multimode optical conductors, an optical material with a refractive index exceeding 2 would be required. Conventional optical plastics and glasses having refractive indices≃1.5 would not accommodate some rays having ray angles of only 3.2°.

To accommodate greater maximum ray angles, the planar face 18 may be provided with a reflective coating. This requires additional materials and processing.

Figure 3:
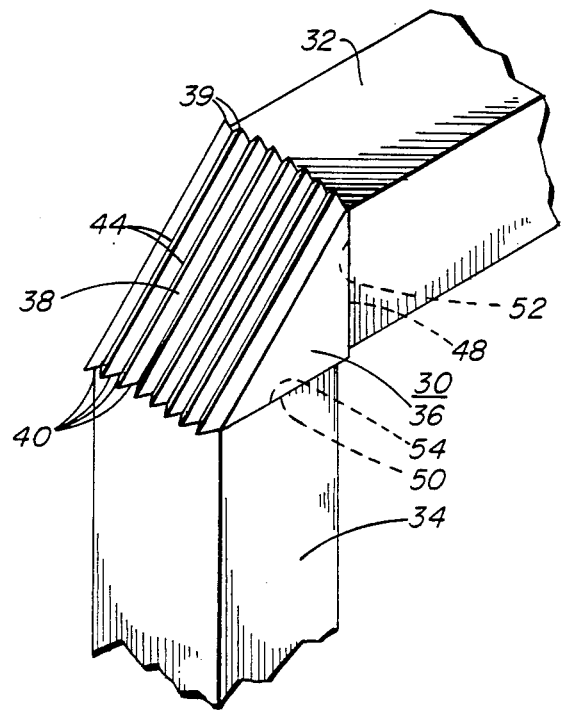
FIG. 3 is a perspective view of an arrangement according to an embodiment of the invention for diverting light through a right angle.
Figure 4:
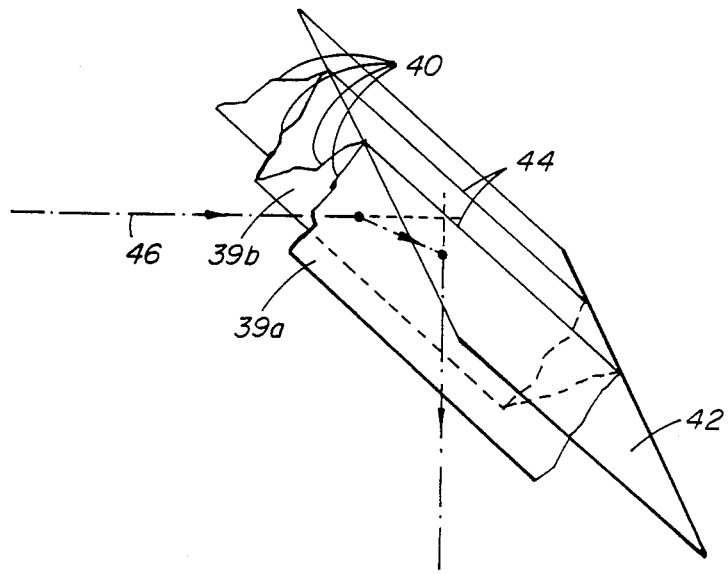
FIG. 4 is a ray diagram for a portion of a ridged face of the arrangement shown in FIG. 3, illustrating the operation of the arrangement of FIG. 3.

In FIG. 3, an arrangement 30 constructed according to an embodiment of the invention for diverting light through a right angle comprises mutually perpendicular optical conductors in the form of elongate members 32, 34 of light transmissive material, such as polycarbonate plastics or glass, joined by a connecting member 36. The connecting member 36 is a body of similar light transmissive material having a ridged reflecting face 38. Each ridge 39 of the face 38 comprises a pair of mutually perpendicular facets 40, each facet 40 inclined 45° to a notional plane 42 passing through peaks 44 of the ridges 39 (see FIG. 4). The notional plane 42 is inclined 45° to the respective axes of the elongate members 32, 34 and includes their point of intersection.

Light incident on the ridged reflecting face 38 along the axis of one of the elongate members 32, 34 will be reflected first at one facet 39a, then at an adjacent facet 39b, to travel substantially parallel to the axis of the other of the elongate members 32, 34. For an axial ray 46, the angle of incidence for the reflection at each facet 39a, 39b is 60°. Hence, the Snell's Law condition for total internal reflection at each facet 39 for such an axial ray 46 is:

$$n > \text{secant}(60°) \simeq 1.15,$$

where n is the refractive index of the connecting member 36. This condition is readily met with conventional optical plastics and glasses.

The Snell's Law condition for total internal reflection of a ray at an angle Δ to the axial ray 46 is:

$$n > \text{secant}(60° - \Delta).$$

Thus, to accommodate a ray angle of 15°, an optical material with a refractive index of ≃1.414 would be required. This condition is also readily met with conventional optical plastics and glasses, without the need for a reflective coating on the ridged face 38. Thus, the light diverting arrangement 30 with a ridged face 38 accommodates a wider range of ray angles than the light diverting arrangement 10 with a planar surface 18, assuming they are constructed from identical materials.

In the embodiment shown in FIG. 3, the connecting member 36 has mutually perpendicular planar faces 48, 50. These planar faces are butted against respective end faces 52, 54 of the elongated members 32, 34 respectively to optically couple the elongated members to the connecting member 36. Alternatively, the connecting member 36 may be integral with one or both of the elongated members 32, 34. For example, the connecting member and one or both of the elongated members could be integrally moulded.

Note that the width, depth and number of the ridges 39 on the ridged reflecting face 38 are not critical so long as the adjacent facets making up each ridge 39 are appropriately located and oriented with respect to one another and the elongated members 32, 34. For diversion of light through a right angle, as described above, the adjacent facets making up each ridge 39 should be mutually perpendicular and inclined 45° relative to the notional plane 42, and the notional plane 42 should include the point of intersection of the axes of the two optical conductors. Use of a larger number of narrower and shallower ridges reduces the overall dimensions of the arrangement and facilitates fitting of a dust cover to the face 38 to prevent its contamination.

The facets 39 may be ruled into the face 38 to define grooves rather than ridges. Such grooves may allow some light to escape at the edges of the face 38, but such losses should not be large if the width and depth of the grooves are small relative to the transverse dimensions of the optical conductors.

The principles employed in the embodiment shown can be applied for diversion of light through angles other than 90° by changing the orientation of the ridged face so that the notional plane passing through the peaks of the ridges has a normal direction which bisects the angle through which light is to be diverted.

What is claimed is:

1. An arrangement for diverting light from a first direction through a predetermined angle to a second direction, the arrangement comprising:
   first and second optical conductors for alignment, respectively, with said first and second directions, each optical conductor comprising an elongate member of light transmissive material; and
   a connecting member for optically connecting said first and second optical conductors together;
   said connecting members having a face comprising at least one pair of adjacent facets extending in mutually intersecting planes, the line of their intersection extending parallel to the plane containing said first and second directions and inclined to said first and second directions such that light incident on one of said pair of adjacent facets in said first direction will be reflected at said one of said facets onto the other of said pair of adjacent facets and reflected at said other of said adjacent facets to depart from said other of said adjacent facets in said second direction.

2. An arrangement for diverting light as defined in claim 1, wherein said face of said connecting member comprises a plurality of said pairs of adjacent facets extending in intersecting planes, the line of intersection of each pair extending parallel to those of the other pairs in a common plane perpendicular to said plane containing said first and second directions.

3. An arrangement for diverting light as defined in claim 2, wherein said common plane has a normal direction which bisects said predetermined angle between said first and second directions, and each one of said facets is inclined 45° relative to said common plane and oriented normal to each of its adjacent facet.

4. An arrangement for diverting light as defined in claim 1, 2 or 3 wherein the connecting member is integral with both the first optical conductor and the second optical conductor.

5. An arrangement for diverting light from a first direction through a predetermined angle to a second direction, the arrangement comprising:
   first and second optical conductors for alignment, respectively, with said first and second directions; and
   a connecting member for optically connecting said first and second optical conductors together;
   said connecting member having a reflecting face comprising at least one pair of adjacent facets extending in mutually intersecting planes, the line of their intersection extending parallel to the plane containing said first and second directions and inclined to said first and second directions such that light incident on one of said pair of adjacent facets in said first direction will be reflected at said one of said facets onto the other of said pair of adjacent facets and reflected at said other of said adjacent facets to depart from said other of said adjacent facets in said second direction, and said connecting member further having
   first and second substantially planar faces, each oriented substantially normal to a respective one of said first and second directions for abutment with a respective one of said first and second optical conductors so as to optically couple said respective optical conductors to said connecting member.

6. An arrangement for diverting light as defined in claim 5, wherein said reflecting face of said connecting member comprises a plurality of said pairs of adjacent facets extending in intersecting planes, the line of intersection of each pair extending parallel to that of the or each other pair in a common plane extending perpendicular to said plane containing said first and second directions.

7. An arrangement for diverting light as defined in claim 6, wherein said common plane has a normal direction which bisects said predetermined angle between said first and second directions, and each one of said facets is inclined substantially 45° relative to said common plane and oriented normal to each of its adjacent facets.

8. An optical conductor having an integral reflecting member comprising an elongate body of light transmissive material having a face comprising at least one pair of adjacent facets extending in mutually intersecting planes the line of their intersection inclined to the longitudinal axis of said elongate member such that light conducted along said elongate member and incident on one of said pair of adjacent facets will be reflected at said one of said facets onto the other of said pair of adjacent facets, and reflected at said other of said adjacent facets so as to depart laterally from said elongate body.

9. An optical conductor as claimed in claim 8, wherein said face comprises a plurality of pairs of adjacent facets extending in mutually intersecting planes, the line of intersection of each pair extending parallel to those of the other pairs in a common plane inclined to said longitudinal axis.

10. An optical conductor as claimed in claim 9 wherein each of said facets is inclined 45° relative to said common plane and oriented normal to its adjacent facet.

11. An optical conductor as defined in claim 10, wherein said common plane has a normal direction inclined 45° relative to said longitudinal axis.

12. An arrangement for diverting light as defined in claim 5, 6 or 7, wherein said first and second substantially planar faces are substantially perpendicular to each other.

* * * * *